UNITED STATES PATENT OFFICE.

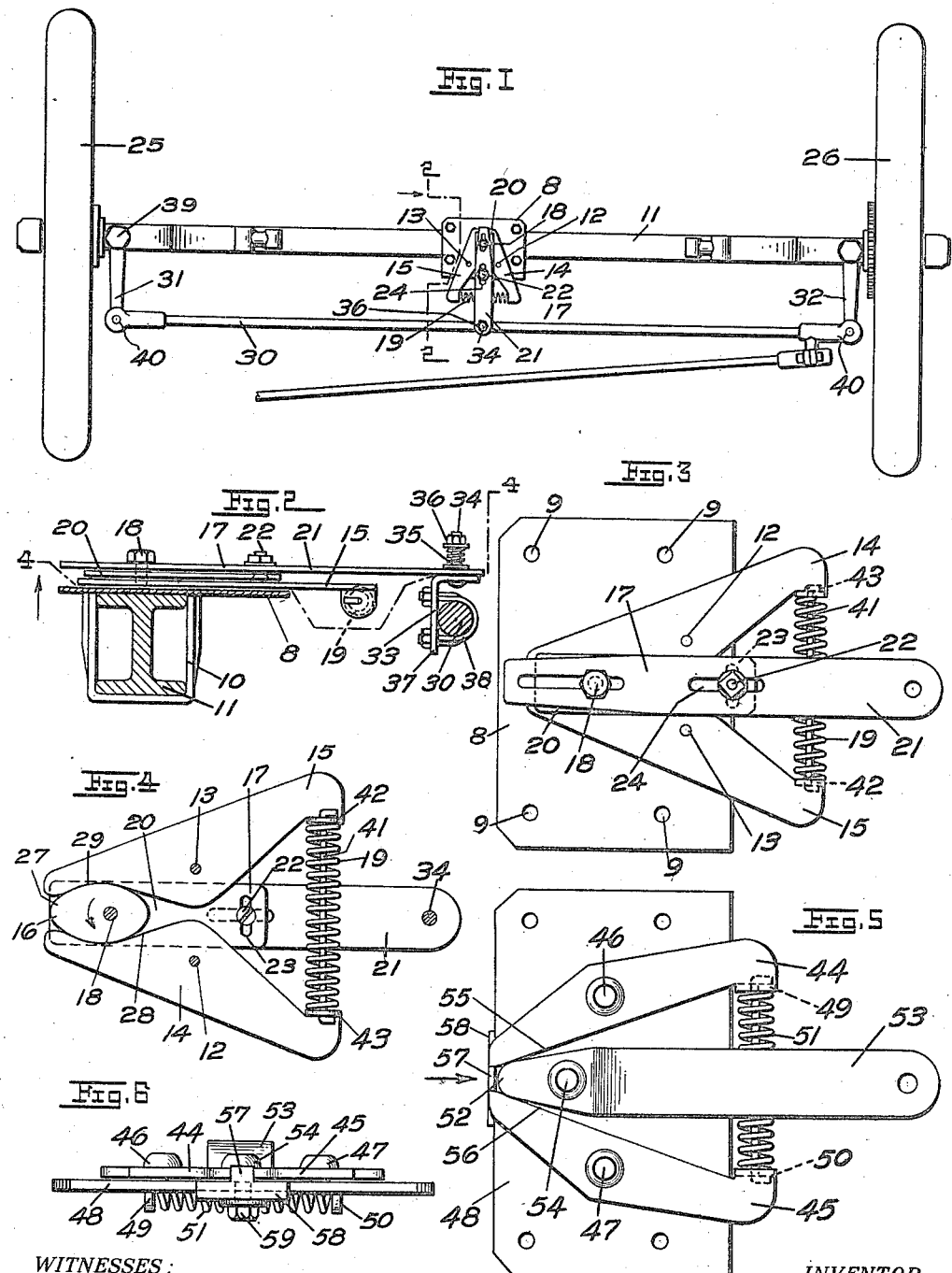

FREDERICK M. ROSS, OF CINCINNATI, OHIO.

SAFETY STEERING DEVICE FOR AUTOMOBILES.

1,248,014. Specification of Letters Patent. Patented Nov. 27, 1917.

Application filed July 16, 1915. Serial No. 40,157.

*To all whom it may concern:*

Be it known that I, FREDERICK M. ROSS, a citizen of the United States of America, and resident of Cincinnati, county of Hamilton, State of Ohio, have invented certain new and useful Improvements in Safety Steering Devices for Automobiles, of which the following is a specification.

This invention relates to improvements in safety steering devices for automobiles and has for an object to produce a safety steering device in which the reach rod connecting the steering knuckles is reinforced between its ends.
A further object is to produce a safety stering device in which a single compression spring is employed for operating the device and for taking up movements in both directions of the operating portions thereof.
A further object is to produce an improved safety steering device in which means are provided for adjusting the position of the operating portions of the device to bring the front road wheels to their normal straight ahead positions should any portion of the steering mechanism break.

These and other objects are attained in the steering device described in the following specification and illustrated in the accompanying drawings in which:

Figure 1 is a plan view of the front axle, front road wheels, and a portion of the steering mechanism of an automobile, with a safety steering device embodying my invention mounted in position on the front axle and operatively connected with the steering mechanism.

Fig. 2 is a sectional view of the device illustrated in Fig. 1, taken on the line 2—2 of Fig. 1.

Fig. 3 is a plan view, of the device illustrated in Figs. 1 and 2.

Fig. 4 is a sectional view taken on the line 4—4 of Fig. 2.
Fig. 5 is a plan view of a modification of the device embodying my invention.

Fig. 6 is a view looking in the direction of the arrow in Fig. 5.

Fig. 7 is a perspective view of a detail of the steering device shown in Figs. 5 and 6.

The steering device forming the preferred embodiment of my invention, and illustrated in Figs. 1 to 4 inclusive, consists of a plate 8 having apertures 9 through which U shaped bolts 10 which are adapted to embrace the axle 11, are passed for the purpose of securing the plate in position on the axle. Pivotally mounted on the plate on pins 12 and 13 are levers 14 and 15, the forward ends of the levers being adapted to engage the cam 16 secured to the under side of a lever 17 pivotally mounted on a pin 18 secured to the plate. The rear ends of the levers 14 and 15 are down turned to engage the opposite ends of a spring 19 located between them. The lever 17 is preferably formed in two portions, the under portion 20 of which has secured to its end face the cam 16 and the top portion 21 of which is secured to the portion 20 by means of a bolt 22 passing through the two portions. This bolt is mounted in a slot 23 formed in the end of the portion 20 and extends through a slot 24 formed in the portion 21, the slots 23 and 24 being located at right angles to one another so as to afford adjustment of the portion 21 longitudinaly and transversely of the portion 20. The purpose of the longitudinal adjustment is to adapt the device to be used on cars of various makes, and the purpose of the transverse adjustment is to permit the portion 21 to be adjusted relatively to the portion 20 for the purpose of bringing the levers in correct position after the steering wheels 25 and 26 of the vehicle have been brought to their straight ahead positions. The cam 16 is of such a shape that it will cause the lever 14 to operate to compress the spring 19 when it is moved in the direction indicated by the arrow in Fig. 4, and the lever 15 will be operated to compress the spring 19 when it is moved by the cam moving in an opposite direction to that of the arrow, although the cam is so shaped that the end opposite the front end 27 will cause the lever 14 to operate while the opposite end will also swing into engagement with the opposite lever 15 and cause it to operate, although not to such a great extent as the lever acted upon by the front end of the cam. The edges 28 and 29 against which the cam operates are also curved for the purpose of enabling the cam to work more efficiently in connection with the levers and for causing the levers to be operated without excessive wear. The means employed for securing the end of the portion 21 of the lever 17, to the reach rod 30 connecting the steering knuckle arms 31 and 32 of the wheels 25 and 26, consists of an L shaped plate 33 yieldingly secured to the portion 21 of the lever 17 by means of a bolt 34 having a spring 35 located between the portion 21 of the lever 17 and the nut 36 of the bolt. Passing through apertures formed in the downwardly extending portion 37 of the angle plate 33, are the ends of a U shaped bolt 38 which embraces the reach rod 30 and holds the angle plate securely thereto. This construction is such that the center of the reach rod and the center of the bolt 34 are in the same plane with the lever portion 21 capable of adjustment with relation to the portion 20 to render the distance between the pin 18 and the bolt 34, equal to the distance between the knuckle pin 39 and the pin 40 connecting the ends of the steering knuckle arms 31 and 32 with the ends of the reach rod 30. This permits of the three levers forming the knuckle arms 31 and 32 and the lever 17 of the steering device, being the same length and permits them to swing about their respective pivot pins without lost motion, slides being employed in other steering devices to compensate for the unequal center distances, the usual construction being to slit the end of the portion 21 of the lever 17 to permit the bolt 34 to slide therein as the steering wheels are turned. By reason of the positive means of securing the end of the portion 21 to the reach rod 30, the reach rod which is of comparatively small diameter is prevented from vibrating at its center and the yielding connection afforded by the spring 35 permits of this vibration being absorbed, thereby materially strengthening the reach rod and preventing crystallization thereof. Not only does this means of connection strengthen the reach rod but it also eliminates the noise occasioned by the vibration of the reach rod at its connection with the knuckle arms 31 and 32. A rod 41 extending through the spring 19 is provided for the purpose of preventing the spring from buckling when the spring engaging ends of the levers 14 and 15 are moved toward one another, the ends of the rod 41 being turned over into engagement with the lugs 42, 43 formed on the levers 14 and 15 to prevent its displacement.

In the modification of my improved steering device, illustrated in Figs. 5 to 7 inclusive, levers 44 and 45 are provided, these levers being pivotally mounted upon pins 46 and 47 mounted in a plate 48, in the same manner that the levers 14 and 15 are mounted upon the pins 12 and 13 in the plate 8. The levers 44 and 45 like the levers 14 and 15, are provided with down turned lugs 49 and 50 adapted to engage opposite ends of a compression spring 51 located between them, as in the case of the preferred form of my invention. In this modified form the inner edges of the levers 44 and 45 are straight and are held by the spring 51 in engagement with the opposite sides of a cam shaped surface 52 formed on the short end of an operating lever 53 pivotally mounted on a pin 54 located on the plate 48. In this construction the opposite sides of the cam surface 52 are adapted to alternately engage the opposite straight edges 55 and 56 of the levers 44 and 45, so that but one of the levers 44 and 45 will operate at a time, the other inoperative lever having its end engaging a lug 57 extending upwardly above the plate 48 and formed on the adjustable plate 58 secured to the under side of the plate 48 by means of a bolt 59 mounted in the plate 48 and passing through the slot 60 formed in the plate 58. The purpose of adjustably mounting the stop 57 against which the ends of the levers 44 and 45 abut, is to enable the device to be centered when the front wheels 25 and 26 of the vehicle are located in their straight ahead position. This permits of the stop being so located that the straight edges 55 and 56 of the levers 44 and 45 will engage the opposite sides of the cam surface 52 with equal pressure when the front wheels are located in their straight ahead positions.

Having thus described my invention, what I claim is:

1. A safety steering device comprising a lever pivotally mounted between its ends, one of the ends of said lever having cam shaped edges, a lever pivotally mounted between its ends on each side of the first mentioned lever in engagement with an adjacent cam shaped edge of the first mentioned lever, and means adapted to yieldingly maintain the second mentioned levers in engagement with the cam shaped edges of the first mentioned lever.

2. In combination in a safety steering device for automobiles a series of levers pivotally mounted between their ends, one of said levers being located between the remaining levers, with the lever arms at one end of the levers in engagement with one another, a spring adapted to engage the opposite ends of the remaining levers to maintain the levers in yielding engagement with the centrally located lever, and adjustable means adapted to change the normal position of the centrally located lever with relation to the remaining levers.

3. In a safety steering device for automobiles the combination of a lever pivotally mounted between its ends, whereby a short lever arm and a long lever arm are formed, the long lever arm being equal in length to the arms of the steering knuckles of the automobile, the short lever arm having a cam shaped end, a lever pivotally mounted between its ends on each side of the first mentioned lever and having one of its ends adapted to engage one side of the cam, the opposite ends of the cam-engaging levers being adapted to engage a spring located between them.

4. In a safety steering device for automobiles the combination of a lever pivotally mounted between its ends on the vehicle axle, said lever consisting of two portions adjustably secured together, one of said portions having a transversely extending slot formed therein, the other portion having a longitudinally extending slot formed therein, said slots registering with one another, a bolt passing through said slots adapted to lock said portions together in their adjusted positions, means adapted to yieldingly engage one end of the lever to return the lever to its normal position when it is moved therefrom, and a second means adapted to yieldingly connect the opposite end of the lever to the reach rod of the steering gear.

5. In combination in a safety steering device for automobiles, a lever pivotally mounted between its ends, whereby a short lever arm and a long lever arm are formed, the long lever arm being equal in length to the arms of the steering knuckles of the automobile, the short lever arm having a cam shaped end, a lever pivotally mounted between its ends on each side of the first mentioned lever and having one of its ends adapted to engage one side of the cam, the opposite ends of the cam engaging levers being adapted to engage a spring located between them, said cam being so shaped as to cause simultaneous operation of both of said cam engaging levers when said first mentioned lever is moved.

6. In a device of the class described, a support adapted to be mounted on the frame of a motor vehicle, a lever pivoted thereto, means for pivotally connecting said lever with a connecting rod, a pair of levers pivoted between their ends on opposite sides of said first lever, means yieldingly tending to draw one end of each of said pair of levers toward one limit of movement, means for fixing said limit of movement, and means for operatively connecting said first lever with said second levers, whereby movement of said first lever in either direction moves one of said second levers, said last named means being arranged to allow the other of said levers, during such movement, to remain stationary.

7. In a steering attachment for automobiles, a pivoted arm constructed for connection to a movable part of the steering mechanism, other spring-controlled pivoted arms movable in opposite directions into opposing engagement with the first-named arm, and a support for the arms constructed for fixed attachment to a relatively fixed portion of the vehicle and provided with stop means for limiting the movement of the second-named arms under the action of the spring means controlling them.

In testimony whereof, I have hereunto subscribed my name this 13th day of July, 1915.

FREDERICK M. ROSS.

Witnesses:
 WALTER F. MURRAY,
 W. THORNTON BOGERT.

Copies of this patent may be obtained for five cents each, by addressing the "Commissioner of Patents, Washington, D. C."